May 8, 1956 — H. G. YETTER — 2,744,460
BEAM CLAMP
Original Filed Sept. 29, 1950
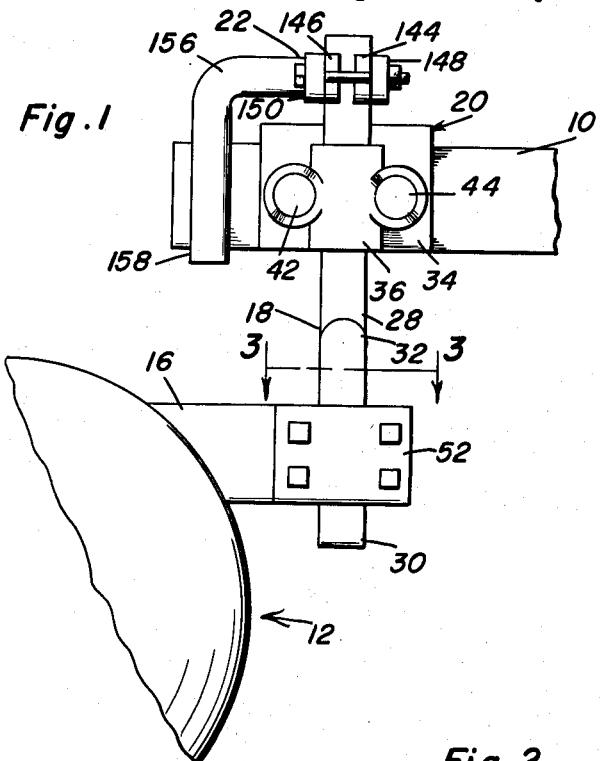
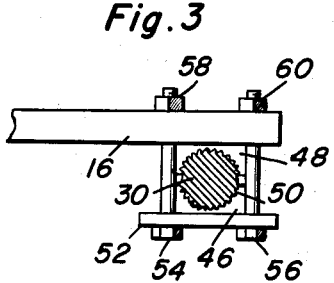
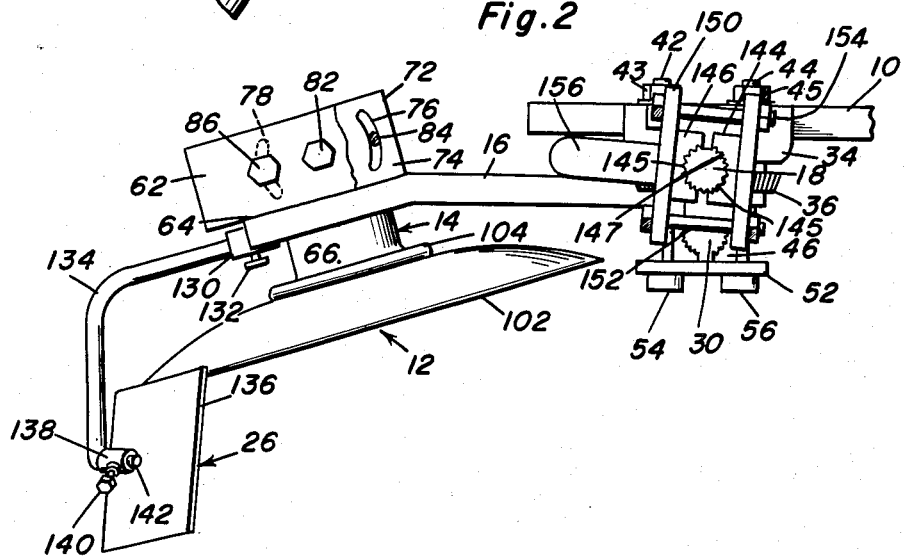
Harry G. Yetter
INVENTOR.

United States Patent Office 2,744,460
Patented May 8, 1956

2,744,460

BEAM CLAMP

Harry G. Yetter, Colchester, Ill.

Original application September 29, 1950, Serial No. 187,581. Divided and this application May 18, 1954, Serial No. 430,565

3 Claims. (Cl. 97—198.1)

The present invention relates to a beam clamp, and particularly to improvements in apparatus for association with disk colters and to means for mounting the disk colter with respect to a plow beam or bar.

This application is a division of my copending application Serial No. 187,581, filed September 29, 1950.

It is an object of the present invention to provide a novel auxiliary attachment whereby the same may be attached to the colter shank when slippage occurs between the colter shank and the clamping means supporting the colter shank on the plow beam.

A further object of the present invention resides in the provision of a novel means for securing the colter bracket to the colter shank whereby rotation of the colter bracket with respect to the colter shank is prevented and a bracket may be secured in any desired relation to the shank.

Still another object of the present invention resides in the novel cooperation between the bearing housing of the disk colter and a bracket for supporting the bearing housing whereby the disk colter may be angularly adjusted with respect to the bracket and colter shank.

Still other objects of the present invention are to provide such means that are simple in construction, economical of manufacture, easily assembled and disassembled and of general serviceability.

Various other objects and advantages of the present invention will become apparent from the following detailed description. The best forms in which I have contemplated using my invention are clearly illustrated in the accompanying drawing, wherein:

Figure 1 is a side elevational view of a portion of the disk colter mounting showing an auxiliary clamp for use in conjunction with the means for supporting the colter shank on the plow beam whereby the colter shank cannot rotate with respect to the plow beam;

Figure 2 is a top plan view of the colter construction and mounting therefor; and Figure 3 is a horizontal transverse sectional view taken substantially along the plane of the section line 3—3 of Figure 1.

Referring more particularly to the drawings, wherein like numerals designate like parts throughout, the numeral 10 designates generally the plow beam or bar to which the disk colter assembly 12, bearing housing 14, colter bracket 16, colter shank 18 and colter shank attaching means 20 are secured for support. The numeral 22 designates generally the auxiliary clamp employed in conjunction with the structure of the present invention, while the numeral 26 designates generally the deflector plate for use in conjunction with the disk colter 12.

The plow beam 10 is of conventional form, being substantially rectangular in cross-section. The colter shank 18 is also of conventional form, having a first upstanding portion 28, a second offset portion 30 in parallel relation to the upper portion 28 and a connecting portion 32. The colter shank 18 is secured to the plow beam 10 by means of the bracket 20.

In Figures 1 and 2, the bracket 20 will be seen to comprise a pair of clamping plates 34 and 36 each being provided with similar cylindrical recesses. Bolts 42 and 44 engage the second clamping element 36 and pass through the plow beam 10 and first clamping element 34 and are threadedly secured by nuts 43 and 45, whereby the colter shank 18 will be fixedly secured with respect to the plow beam 10.

Looking now at Figure 3, it will be seen that the means for securing the colter bracket 16 to the colter shank 18 is comprised of a pair of jaws 46 and 48 which are formed with serrated and substantially semi-cylindrical recesses 50 for engagement on the lower end 30 of the shank 18. The jaw 48 is integrally secured to the bracket 16 while the jaw 46 is secured to the plate 52. A pair of bolts 54 and 56 extend through the plate 52 and bracket 16 and nuts 58 and 60 are threadedly engaged on their outer ends for clamping the jaws 46 and 48 to the colter shank 18.

The outer end of the bracket 16 is provided with a right angularly extending plate 62 which is welded thereto, as seen in Figure 2. Figure 2 shows the bearing housing 14 as comprising a sleeve 66 having an extension plate 72. The upper surface of the plate 72 is flattened, as at 74, for positioning against the underside of the plate 62 of the bracket 16.

As best seen in Figure 2, the plate 72 is provided with a pair of elongaed arcuated slos 76 and 78 and a central aperture (not shown) is provided for receiving bolt 82. The bolt 82 extends through the plate 62 for fixedly securing the housing 14 with respect to the plate 62 and bracket 16 as desired. Bolts 84 and 86 extend through the plate 62 and arcuated slots 76 and 78, nuts being provided on the underside of the plate 72 for threaded engagement on the shanks of the bolts 84 and 86 for fixedly securing the plate 72 to the plate 62 in a desired angular relation.

The disk colter assembly 12 is comprised of a disk 102, having a first clamping plate 104 and a second clamping plate (not shown) on opposite sides of the disk 102, the disk and clamping plates being journaled in the bearing sleeve 66.

An attaching plate 130 is integrally secured to the housing 14 and has a setscrew 132 threadedly engaged therein. An angulated arm 134 is slidably received within the sleeve 130 and adjusted in a desired angular relation by means of the setscrew 132. A deflector plate 136 is similarly provided with a sleeve 138 having a setscrew 140. The angulated end 142 of the arm 134 being slidably received within the sleeve 138 and secured in desired angular relation by means of setscrew 140. The deflector plate 136 is of arcuated cross section and is adapted to overlie the outer periphery of the disk 102 with the elements of the deflector plate extending substantially at right angles to the plane of the disk 102.

It will readily be seen that the deflector plate 136 is particularly adapted for deflecting the centrifugally flying turf and rocks in an outward and downward direction from the disk colter to cover the weeds and rubbish on the surrounding ground.

The clamp 22 is comprised of a pair of clamping jaws 144 and 146 which are secured to the plates 148 and 150, the jaws 144 and 146 being provided with serrated substantially semi-cylindrical recesses 145 and 147 for engagement with the upper end of the colter shank 18. Bolts 152 and 154 clamp the jaws 144 and 146 to the colter shank and one of the plates 150 has an outwardly extending angulated bar 156 integrally secured thereto. The downwardly extended angulated end 158 of the bar 156 is adapted to abut against the plow beam 10 to prevent rotation of the colter shank 18. The auxiliary clamp 22 is particularly adapted for use when slippage begins to occur between the colter shank 18 and the clamping means 20.

From the foregoing description taken in conjunction with the accompanying drawings, it is believed that means have been provided which will accomplish all of the objects hereinbefore set forth.

What is claimed as new is as follows:

1. In a disk colter apparatus comprising a downwardly extending disk colter shank attached to a plow bar and having a disk colter bracket secured to its lower end, a bearing housing angularly adjustable with respect to and secured to said bracket, a means for securing said shank to said plow bar to prevent relative movement, said means including a pair of clamping plates disposed on one side of the plow bar, each of said clamping plates being provided with a semi-cylindrical recess, and bolts for clamping said clamping plates about the upper portion of said shank and securing said plates to said bar, an auxiliary clamp including a pair of jaws, said jaws having serrated shank engaging recesses therein, bolts for clamping said jaws on said colter shank, and one of said jaws being provided with an angulated end for engagement with said plow bar to prevent rotation of said colter shank with respect thereto.

2. In a disk colter apparatus comprising a downwardly extending disk colter shank attached to a plow bar and having a disk colter bracket secured to its lower end, a means for securing said shank to said plow bar to prevent relative movement, said means including a pair of clamp plates disposed on one side of said plow bar, said clamp plates having an upper portion of said shank disposed therebetween, and fasteners clamping said clamping plates about said upper portion of said shank and securing said plates to said plow bar, an auxiliary clamp including a pair of jaws secured to said shank, one of said jaws being provided with an angulated end for engagement with said plow bar to prevent rotation of said shank with respect thereto.

3. In a disk colter apparatus comprising a downwardly extending disk colter shank attached to a plow bar and having a disk colter bracket secured to its lower end, a means for securing said shank to said plow bar including a first clamp securing an upper portion of said shank to said plow bar against rotation, and an auxiliary clamp including a pair of jaws secured to said shank, one of said jaws being provided with an angulated end for engagement with said plow bar to prevent rotation of said shank with respect thereto.

References Cited in the file of this patent

UNITED STATES PATENTS

| | | |
|---|---|---|
| 69,883 | Wilton | Oct. 15, 1867 |
| 300,688 | Brother et al. | June 17, 1884 |
| 501,916 | Caldwell | July 25, 1893 |
| 669,165 | Hartzell | Mar. 5, 1901 |
| 840,922 | Dickinson | Jan. 8, 1907 |
| 941,191 | Ditmar | Nov. 23, 1909 |
| 944,478 | Brown | Dec. 28, 1909 |
| 1,164,518 | Herdlein | Dec. 14, 1915 |
| 1,360,531 | Hyatt | Nov. 30, 1920 |
| 1,435,873 | Petersen | Nov. 14, 1922 |
| 1,811,232 | Gilson | June 23, 1931 |